United States Patent
Kapur et al.

(10) Patent No.: US 9,574,064 B2
(45) Date of Patent: Feb. 21, 2017

(54) PROCESSES AND COMPOSITIONS FOR INJECTION BLOW MOLDING

(75) Inventors: Mridula Kapur, Lake Jackson, TX (US); Alan T. Radwanski, Manvel, TX (US)

(73) Assignee: Dow Global Technologies LLC, Midland, MI (US)

( * ) Notice: Subject to any disclaimer, the term of this patent is extended or adjusted under 35 U.S.C. 154(b) by 356 days.

(21) Appl. No.: 13/056,710

(22) PCT Filed: Aug. 28, 2009

(86) PCT No.: PCT/US2009/055328
§ 371 (c)(1),
(2), (4) Date: Jan. 31, 2011

(87) PCT Pub. No.: WO2010/025342
PCT Pub. Date: Mar. 4, 2010

(65) Prior Publication Data
US 2011/0136983 A1 Jun. 9, 2011

Related U.S. Application Data

(60) Provisional application No. 61/092,594, filed on Aug. 28, 2008.

(51) Int. Cl.
*B29C 49/06* (2006.01)
*C08F 10/02* (2006.01)
*C08L 23/04* (2006.01)
*C08K 5/00* (2006.01)
*B29C 49/00* (2006.01)
*C08K 5/098* (2006.01)
*C08K 5/20* (2006.01)
*B29C 37/00* (2006.01)
*B29L 31/00* (2006.01)

(52) U.S. Cl.
CPC ......... *C08K 5/0016* (2013.01); *B29C 49/0005* (2013.01); *C08K 5/098* (2013.01); *C08K 5/20* (2013.01); *B29C 37/0067* (2013.01); *B29C 49/06* (2013.01); *B29L 2031/712* (2013.01)

(58) Field of Classification Search
USPC ... 524/80, 81, 189, 394, 398, 435, 849, 855; 525/191, 240
See application file for complete search history.

(56) References Cited

U.S. PATENT DOCUMENTS

| | | | |
|---|---|---|---|
| 4,578,294 A * | 3/1986 | Ouchi et al. ............. | 428/220 |
| 4,603,173 A * | 7/1986 | Mack et al. ............. | 525/194 |
| 4,806,597 A | 2/1989 | Gallucci et al. | |
| 5,408,015 A | 4/1995 | Hsieh et al. | |
| 5,539,076 A * | 7/1996 | Nowlin et al. ......... | 526/348.1 |
| 5,620,650 A * | 4/1997 | Nakajima et al. ....... | 264/520 |
| 5,643,646 A | 7/1997 | Spence | |
| 5,747,594 A | 5/1998 | deGroot et al. | |
| 5,773,106 A | 6/1998 | deGroot et al. | |
| 5,874,141 A | 2/1999 | Matsui | |
| 6,047,851 A | 4/2000 | Freek et al. | |
| 6,077,922 A | 6/2000 | Johnson et al. | |
| 6,129,960 A | 10/2000 | Kudert et al. | |
| 6,639,001 B1 | 10/2003 | Birnbrich et al. | |
| 6,667,083 B2 | 12/2003 | Hayashi et al. | |
| 6,713,561 B1 | 3/2004 | Berthold et al. | |
| 6,787,608 B2 | 9/2004 | VanDun et al. | |
| 6,822,051 B2 | 11/2004 | Harris | |
| 7,081,285 B1 | 7/2006 | Barre et al. | |
| 7,250,473 B2 | 7/2007 | Schramm et al. | |
| 7,285,617 B2 | 10/2007 | Poloso et al. | |
| 8,129,472 B2 | 3/2012 | Turner et al. | |
| 2003/0113496 A1 | 6/2003 | Harris et al. | |
| 2005/0037166 A1 | 2/2005 | Maziers | |
| 2005/0222338 A1 | 10/2005 | Sinoy et al. | |
| 2005/0261435 A1 | 11/2005 | Starita | |
| 2006/0036384 A1 | 2/2006 | Moriarty et al. | |
| 2006/0155058 A1 | 7/2006 | Berthold et al. | |
| 2006/0269709 A1 | 11/2006 | Maziers | |
| 2006/0281867 A1 | 12/2006 | Jaker | |

(Continued)

FOREIGN PATENT DOCUMENTS

| EP | 0256777 A2 | 2/1988 |
|---|---|---|
| EP | 1040158 A1 | 10/2000 |

(Continued)

OTHER PUBLICATIONS

Rosato, D.V. et al. Injection Molding Handbook 3rd Edition (2000) pp. 1-4.*
Plastic Blow Molding Machins & Molds. available online at http://www.blowmachines.com/kbase/htm on Jun. 27, 2007.*
PCT/US09/055328, International Preliminary Report on Patentability.

(Continued)

*Primary Examiner* — Irina S Zemel
*Assistant Examiner* — Jeffrey Lenihan

(57) ABSTRACT

The invention provides a process for injection blow molding an article, said process comprising injecting into a mold cavity a composition, comprising at least one ethylene-based polymer and less than, or equal to, 1000 ppm of a mold release agent, based on the total weight of the composition. The invention also provides a composition comprising a blend, wherein the blend comprises at least one high molecular weight (HMW) ethylene-based polymer, and at least one low molecular weight (LMW) ethylene-based polymer, and wherein the blend has an unsaturation level, as determined by IR, and expressed as vinyls per 1000 carbon atoms, less than, or equal to, 0.5 vinyls per 1000 carbon atoms, and wherein the high molecular weight (HMW) ethylene-based polymer has a density from 0.925 to 0.950 g/cc.

20 Claims, 3 Drawing Sheets

(56) References Cited

U.S. PATENT DOCUMENTS

| | | |
|---|---|---|
| 2007/0021567 A1 | 1/2007 | Van Dun et al. |
| 2007/0063394 A1 | 3/2007 | Lepage |
| 2007/0129496 A1 | 6/2007 | Shannon et al. |
| 2008/0015318 A1 | 1/2008 | Guenther et al. |
| 2008/0051538 A1 | 2/2008 | Coffy et al. |
| 2008/0114131 A1 | 5/2008 | Harris et al. |
| 2010/0056727 A1 | 3/2010 | Lipishan et al. |
| 2011/0034635 A1 | 2/2011 | Kapur et al. |
| 2011/0178326 A1 | 7/2011 | Sebastian et al. |

FOREIGN PATENT DOCUMENTS

| | | | |
|---|---|---|---|
| EP | 1229053 A2 * | 8/2002 | ............... C08F 8/50 |
| EP | 1 419 183 B1 | 12/2005 | |
| EP | 1 655 333 | 5/2006 | |
| EP | 1311379 B1 * | 2/2007 | |
| JP | 01-168739 A | 7/1989 | |
| JP | 01-229268 A | 9/1989 | |
| JP | 03-92327 | 4/1991 | |
| WO | 99/14271 | 3/1999 | |
| WO | WO-01/23168 A1 * | 5/2001 | |
| WO | 2004/026560 A1 | 4/2004 | |
| WO | 2004101674 A1 | 11/2004 | |
| WO | 2006/036348 A1 | 4/2006 | |
| WO | 2006/101915 A2 | 9/2006 | |
| WO | 2006/138084 A1 | 12/2006 | |
| WO | 2007/003530 A1 | 1/2007 | |
| WO | 2007/067259 A1 | 6/2007 | |
| WO | WO-2007/117520 A2 * | 10/2007 | |
| WO | 2007/130515 A2 | 11/2007 | |
| WO | 2008/008829 A2 | 1/2008 | |
| WO | 2008/012319 A1 | 1/2008 | |
| WO | 2008/016815 A2 | 2/2008 | |
| WO | 2008/024154 A1 | 2/2008 | |
| WO | 2008/051824 A2 | 5/2008 | |
| WO | 2008-064112 A1 | 5/2008 | |

OTHER PUBLICATIONS

PCT/US09/055328, Search Report and Written Opinion.
XP002566104 (JP50-014740).

\* cited by examiner

PROCESSES AND COMPOSITIONS FOR INJECTION BLOW MOLDING

REFERENCE TO RELATED APPLICATIONS

This application claims the benefit of U.S. Provisional Application No. 61/092,594, filed Aug. 28, 2008, and fully incorporated herein by reference.

BACKGROUND OF INVENTION

The invention relates to a process for injection blow molding an article, in which a composition, containing at least one ethylene-based polymer and little or no mold release agent, is injection blow molded.

Injection blow molding (IBM) is a process typically used to make bottles for pharmaceutical and personal care packaging, which require threaded sections with precise dimensions. The IBM process consists of three main steps: injection, blowing and ejection. During the blowing stage, sections of the pre-form may remain adhered to the core rod resulting in non-inflated or partially inflated parts. Thus, mold release agents, such as erucamide or zinc stearate (ZnSt), are commonly compounded with the polymer during polymer production, or added as "salt and pepper" blends at the time of injection blow molding, in order to prevent the polymer from sticking to the core rod. Thus, these mold release agents facilitate the release of the molded article from the mold cavity. The mold release agents typically migrate to the polymer surface, where they provide a medium between the polymer matrix and the core rod/mold surface. This migration can be problematic, because the mold release agents can result in the contamination of the contents placed inside the molded article. Typically, polyethylene resins extruded without mold release agents require more restrictive extrusion conditions. Generally, lower melt temperatures, cooler blowing conditions, and longer cycle times are required to produce an acceptable part. These restrictive conditions can result in lower quality parts and increased production costs.

Extrusion blow molding (EBM), injection stretch blow molding (ISBM), and injection blow molding are the primary blow molding processes used to fabricate plastic containers. While EBM is the most prevalent process to produce polyethylene bottles, IBM comes into play when containers with consistent weight, volume and greater detail in the neck (threaded) area need to be fabricated. Other IBM benefits include more efficient use of resin, as there is no de-flashing, trimming, re-granulation or re-mixing of scrap resin. However, there is a need for an injection blow molding process that uses a composition that requires none or minimal mold release agent. There is a further need for an injection blow molded process that produces articles of various geometries and sizes, in a wide mold/core rod temperature range.

International Publication No. WO 2008/012319 discloses the manufacture of polyethylene based wall articles with improved color and processing conditions by the use of a specific combination of stabilizers. A significant amount of zinc stearate (3000 ppm) is used in some of the formulations as a demolding or release agent.

U.S. Publication No. 2006/0155058 discloses a polyethylene composition with multi-modal molecular mass distribution, which is suitable for blow molding of small containers. The composition has a density in the range of from 0.955 to 0.960 g/cm3, and an MFR190/5 in the range from 0.8 to 1.6 dg/min. It comprises from 45 to 55 percent by weight of a low-molecular-mass ethylene homopolymer A, from 20 to 35 percent by weight of a high-molecular-mass copolymer B made from ethylene and from another 1-olefin having from 4 to 8 carbon atoms, and from 20 to 30% by weight of an ultrahigh-molecular-mass ethylene copolymer C. Calcium stearate (0.1 wt %) is used in an additive package.

U.S. Publication No. 2007/0129496 discloses multimodal polyethylenes having a density from 0.940 to 0.965 g/cm3, and an I21 from 4 to 20 dg/min, and comprising a low molecular weight ethylene copolymer having a weight average molecular weight from 5,000 amu to 50,000 amu, and a high molecular weight ethylene copolymer having a weight average molecular weight from 60,000 amu to 800,000 amu. Both components having a desirable balance of short chain branching, making the multimodal polyethylene suitable for films, pipes, rotomolding applications and blow molding applications. Zinc stearate (1000-1500 ppm) is used in an additive package of some granular resins.

U.S. Pat. No. 5,643,646 discloses a tinted bottle formed by injection blow molding a high density polyethylene. The bottles are injection blow-molded from a mixture containing a high gloss, high density polyethylene resin, a slip agent such as zinc stearate or calcium stearate, and a colorant. The mixture preferably contains about 2-6 percent by weight colorant and about 1-3 percent slip agent with the balance being high density polyethylene resin.

U.S. Publication No. 2005/0037166 discloses an injection blow molded, single layer, hollow packaging, comprising essentially a metallocene-produced polyethylene. The hollow packaging has an external and internal gloss of at least 30, and the metallocene-produced polyethylene has a density of from 0.910 up to 0.966 g/cm3 or up to homopolymer densities, and a melt index MI2 of from 0.5 to 2.5 g/10 min.

U.S. Pat. No. 7,081,285 discloses blown films and blow molded objects, prepared using a polyethylene composition comprising a unimodal metallocene catalyzed polyethylene copolymer. The polyethylene copolymer is disclosed as having a high melt flow rate and good melt strength, allowing it to be useful in both extrusion and injection blow molding.

Additional polyethylene compositions and/or molding processes are disclosed in the following: U.S. Pat. Nos. 5,747,594; 5,773,106; 6,787,608; 6,077,922; 6,822,051; 5,408,015; 6,713,561; 7,250,473; U.S. Publication Nos. 2007/0021567; 2005/0222338; 2008/0051538; 2008/0114131; 2006/0281867; 2008/0015318; 2003/0113496; 2005/0261435; International Publication Nos. WO 2007/003530; WO 2006/138084; WO 2008/008829; WO 2006/036348; WO 2008/016815; WO 2007/130515; WO 2008/051824; European Patent Application No. EP1655333A1; European Patent No. EP1040158B1; and Japanese Patent Application JP3092327A (abstract).

As discussed, there remains a need for an injection blow molding process that uses a composition that does not require the use of a mold release agent, or requires minimal use of a mold release agent. There is a further need for an injection blow molded process that can produce articles of various geometries and sizes with a wide mold/core rod temperature range. In addition, there is a need to produce such articles by reducing cycle time, increasing production rate, decreasing set times, and increasing the temperature at which injection molded parts are produced. Injection blow molded articles with a good balance of properties, such as, stiffness; environmental stress crack resistance (ESCR), and water vapor transmission barrier are also desired. These needs and others have been met by the following invention.

SUMMARY OF THE INVENTION

The invention provides a process for injection blow molding an article, said process comprising injecting into a mold cavity a composition, comprising at least one ethylene-based polymer and less than, or equal to, 1000 ppm of a mold release agent, based on the total weight of the composition.

The invention also provides a composition comprising a blend, wherein the blend comprises at least one high molecular weight (HMW) ethylene-based polymer, and at least one low molecular weight (LMW) ethylene-based polymer, and wherein the blend has an unsaturation level, as determined by IR, and expressed as vinyls per 1000 carbon atoms, less than, or equal to, 0.5 vinyls per 1000 carbon atoms, and wherein the high molecular weight (HMW) ethylene-based polymer has a density from 0.925 to 0.950 g/cc.

DETAILED DESCRIPTION OF THE INVENTION

Figure 1:
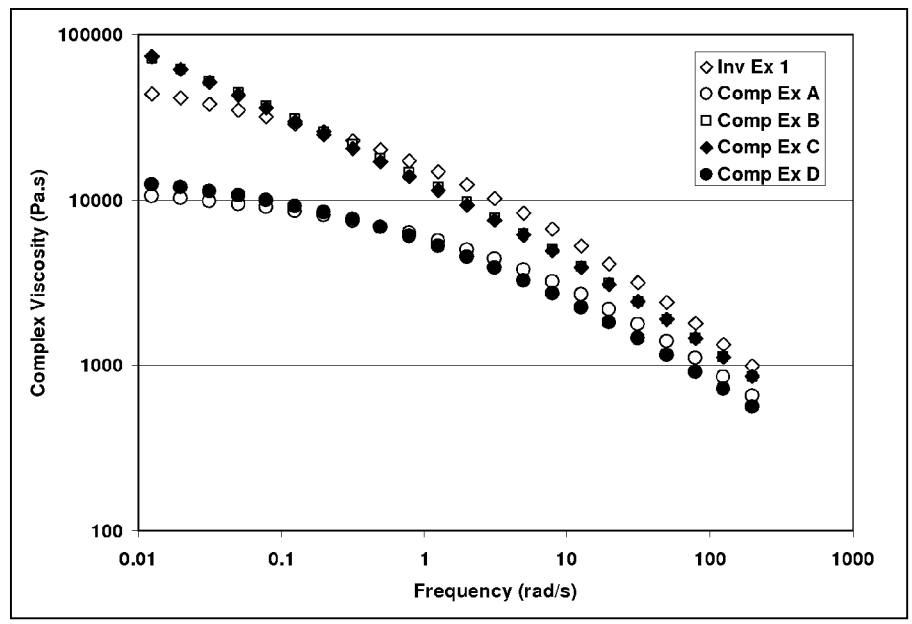
FIG. 1 depicts "complex viscosity (190° C.) versus frequency" profiles for several resins.
Figure 2:
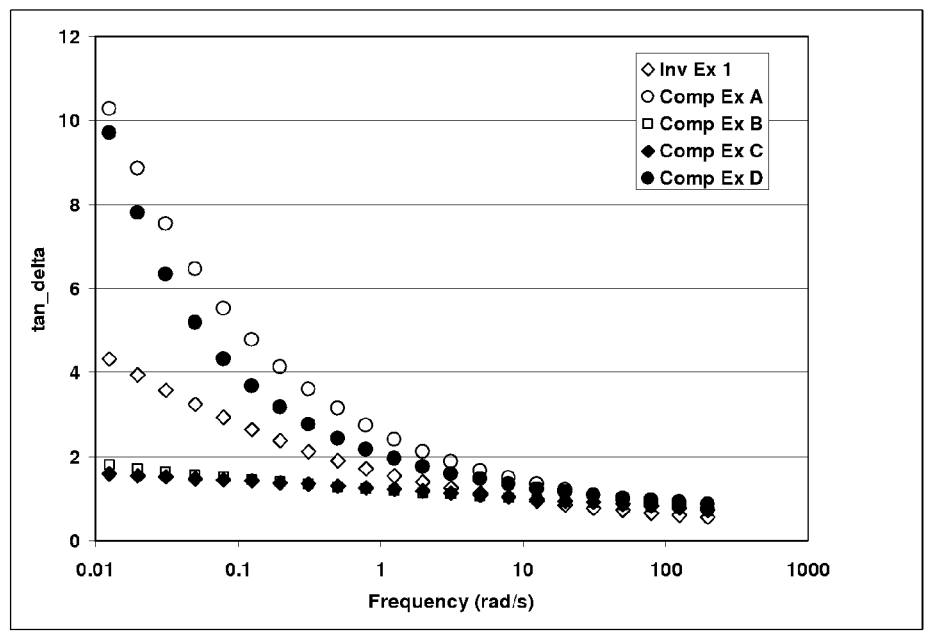
FIG. 2 depicts "tan delta (190° C.) versus frequency" profiles for several resins.
Figure 3:
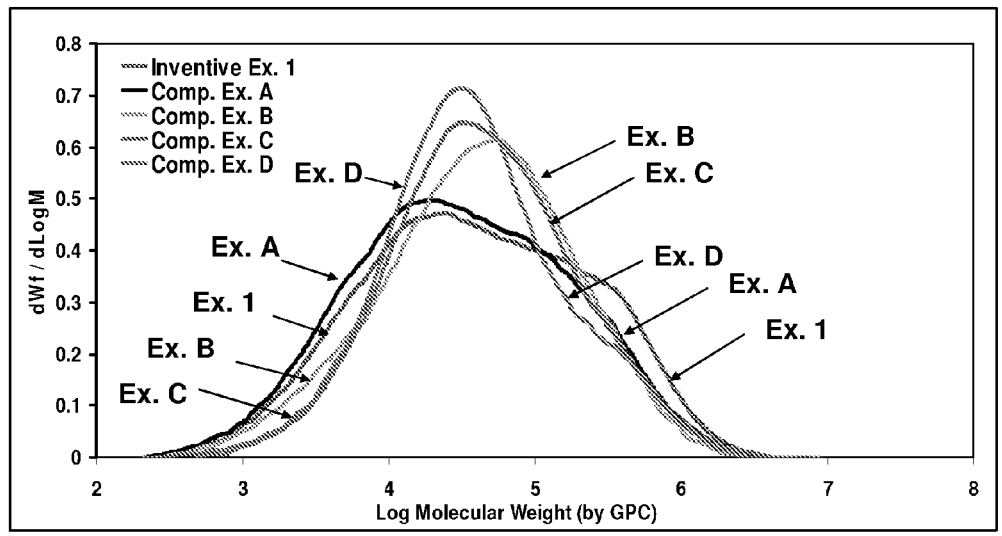
FIG. 3 depicts molecular weight distribution profiles, determined by Gel Permeation Chromatography (GPC), for several resins.
Figure 4:
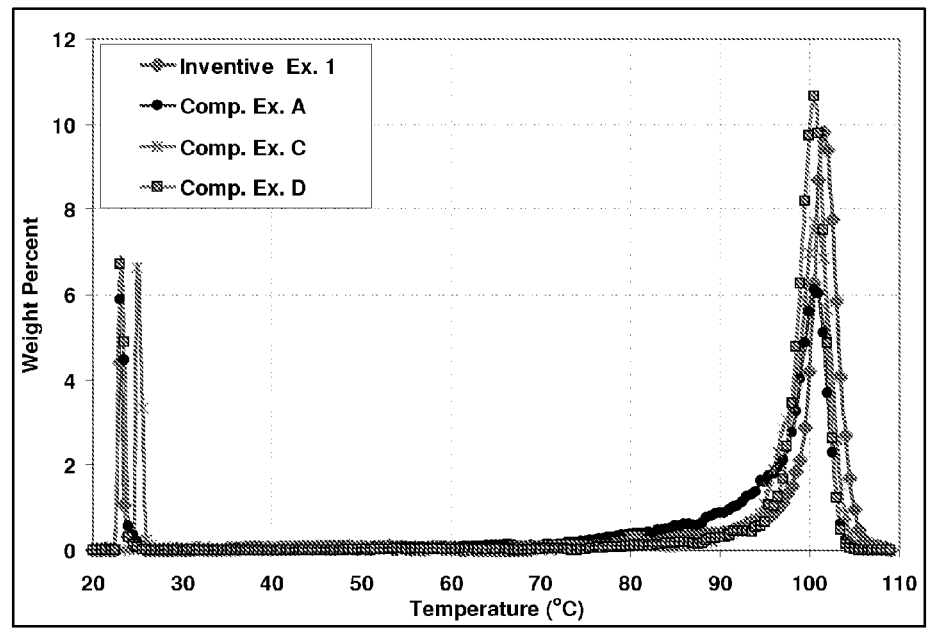
FIG. 4 depicts the Short Chain Branching Distribution (SCBD) for several resins as determined by Analytical Temperature Rising Elution Fractionation (ATREF) method for several resins.
Figure 5:
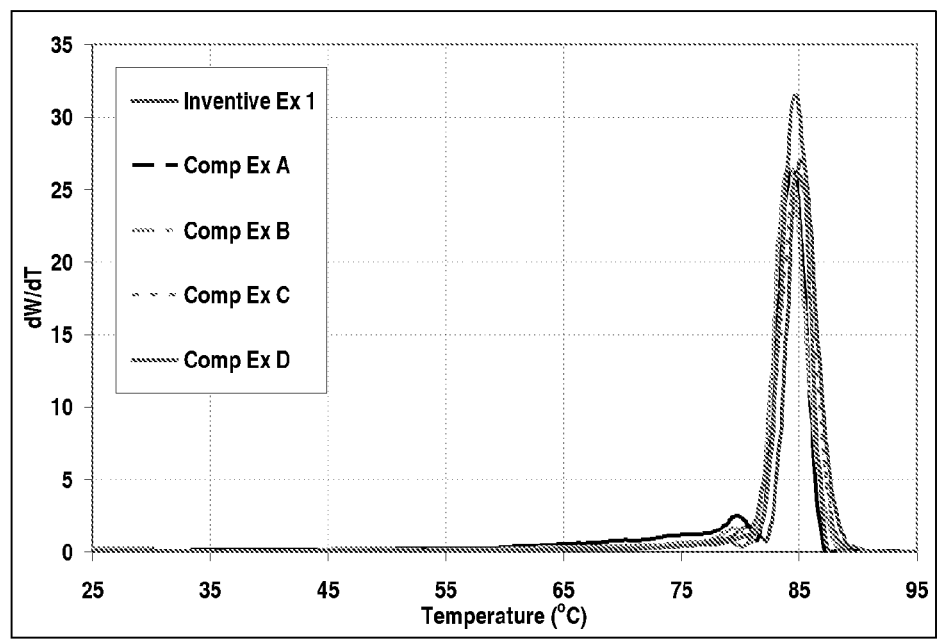
FIG. 5 depicts the SCBD for several resins, as determined by the CRYSTAF (Crystallization Analysis Fractionation) method, in the temperature range from 25° C. to 95° C.
Figure 6:
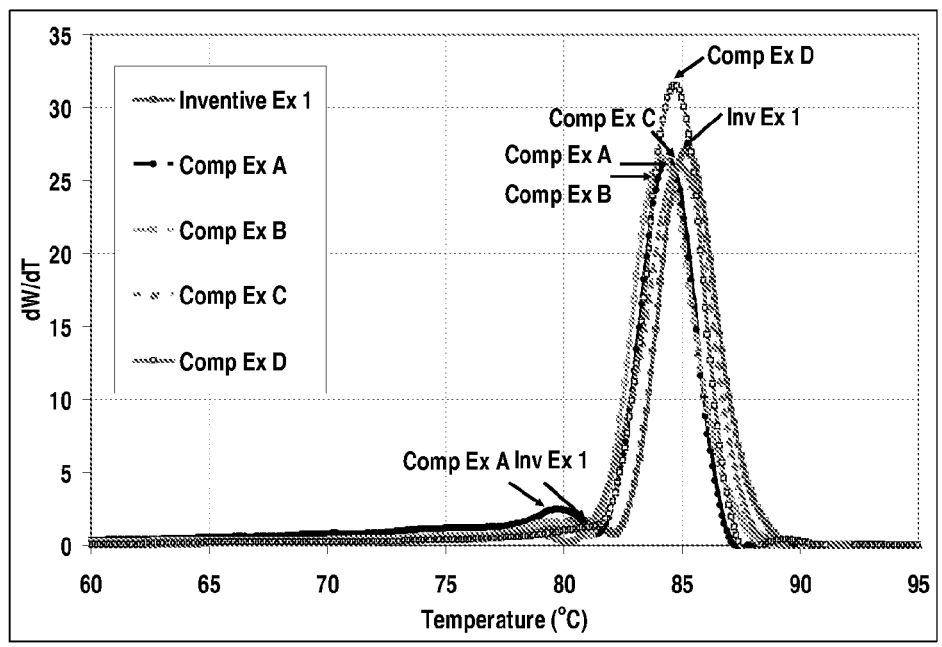
FIG. 6 depicts the CRYSTAF determined SCBD for several resins, in the temperature range from 60° C. to 95° C.

The invention provides a process for injection blow molding an article, said process comprising injecting into a mold cavity a composition, comprising at least one ethylene-based polymer, such that the use of a mold release agent can be reduced or eliminated. The ethylene-based polymer and the injection molded article possess exceptional environmental stress crack resistance, stiffness and water vapor transmission barrier properties.

As discussed above, the invention provides a process for injection blow molding an article, said process comprising injecting into a mold cavity a composition, comprising at least one ethylene-based polymer, and less than, or equal to, 1000 ppm of a mold release agent, based on the total weight of the composition.

In one embodiment, the composition comprises less than 500 ppm, preferably less than 200 ppm, and more preferably less than 100 ppm, mold release agent, based on the total weight of the composition.

In one embodiment, the composition comprises from 1 ppm to less than 500 ppm, preferably from 1 ppm to less than 200 ppm, and more preferably from 1 ppm to less than 100 ppm, mold release agent, based on the total weight of the composition.

In one embodiment, the composition does not comprise a mold release agent.

In one embodiment, the composition is injected around a core pin to form a pre-form; the pre-form is inserted into the mold cavity, equilibrated at an elevated temperature; air is blown into the inner area of the pre-from; the mold cavity is cooled to form the article; and the article is released from the mold cavity. The term "elevated temperature" refers to a temperature above ambient temperature.

In one embodiment, the mold release agent is a zinc-containing metal soap or an amide. In a further embodiment the mold release agent is a zinc-containing metal soap. In a further embodiment, the mold release agent is a zinc carboxylic acid. In a further embodiment, the mold release agent is a zinc monocarboxylic acid.

In one embodiment, the mold release agent is zinc stearate or erucamide. In a further embodiment, the mold release agent is zinc stearate. In another embodiment, the mold release agent is erucamide.

In one embodiment, the mold release agent is a zinc-containing organic compound or an amide. The term "zinc-containing organic compound" refers to an organic compound containing at least one zinc atom.

In one embodiment, the composition has a molecular weight distribution ($M_w/M_n$) from 8 to 30, preferably from 10 to 25, as determined by high temperature GPC equipped with an infrared detector.

In one embodiment, the composition has a molecular weight distribution ($M_w/M_n$) from 8 to 25, preferably from 10 to 20, as determined by high temperature GPC, equipped with an infrared detector.

In one embodiment, the composition has a density from 0.945 to 0.965 g/cc (1 cc=1 cm$^3$), preferably from 0.950 to 0.965 g/cc, and more preferably from 0.955 to 0.960 g/cc.

In one embodiment, the composition has a melt index $I_2$ (190° C., 2.16 kg weight)) from 0.1 to 3 g/10 min, preferably from 0.1 to 1 g/10 min.

In one embodiment, the composition has a high flow melt index $I_{21}$ (190° C., 21.6 kg weight) from 10 to 40 g/10 min, preferably from 20 to 35 g/10 min, more preferably from 22 to 32 g/10 min.

In one embodiment, the composition comprises at least one high molecular weight (HMW) ethylene-based polymer, and at least one low molecular weight (LMW) ethylene-based polymer.

In one embodiment, the HMW ethylene-based polymer has a high flow melt index, $I_{21}$, from 0.1 to 10 g/10 min, preferably from 0.3 to 5 g/10 min, and more preferable from 0.5 to 2 g/10 min.

In one embodiment, LMW ethylene-based polymer has a melt index, $I_2$, from 300 to 900 g/10 min, preferably from 350 to 850 g/10 min, and more preferable from 400 to 800 g/10 min.

In one embodiment, the HMW ethylene-based polymer has a density from 0.925 to 0.950 g/cc, preferably from 0.930 to 0.945 g/cc, and more preferably from 0.935 to 0.940 g/cc.

In one embodiment, the LMW ethylene-based polymer has a density from 0.958 to 0.980 g/cc, preferably from 0.965 to 0.975 g/cc, and more preferably from 0.968 to 0.973 g/cc.

In one embodiment, the HMW ethylene-based polymer and the LMW ethylene-based polymer comprise greater than 85 weight percent, preferably greater than 90 weight percent, and more preferably greater than 95 weight percent of the total weight of the composition.

The HMW ethylene-based polymer and the LMW ethylene-based polymer a blend are comprised in a blend, and wherein the blend has an unsaturation level, as determined by IR, and expressed as vinyls per 1000 carbon atoms, less than, or equal to, 0.5 vinyls per 1000 carbon atoms, more preferably less than, or equal to, 0.3 vinyls per 1000 carbon atoms.

In one embodiment, the blend has a high density fraction (the weight fraction of the one or more peaks located at greater than 80° C. in the ATREF curve) greater than, or equal to, 70 percent, more preferably greater than, or equal to, 73 percent, and most preferably greater than or equal to 75 percent (based on the total peak area under the ATREF curve).

In one embodiment, the blend has a purge fraction (the weight fraction of the polymer which remains in solution in the temperature range 25° C. to 30° C., as determined by ATREF) less than, or equal to, 20 percent, more preferably less than or equal to 15 percent, and most preferably less than or equal to 12 percent (based on the total peak area under the ATREF curve).

In one embodiment, the mold cavity is equilibrated at a temperature from 100° F. to 450° F., preferably from 150° F. to 400° F., and more preferably from 200° F. to 400° F.

In one embodiment, the mold cavity is cooled by water circulation and/or compressed air.

In one embodiment, the article is released from the mold by opening the mold cavity.

An inventive process may have a combination of two or more embodiments as described herein.

The invention also provides an article comprising at least one component formed from an inventive process.

The invention also provides a composition comprising a blend, wherein the blend comprises at least one high molecular weight (HMW) ethylene-based polymer, and at least one low molecular weight (LMW) ethylene-based polymer, and wherein the blend has an unsaturation level, as determined by IR, and expressed as vinyls per 1000 carbon atoms, less than, or equal to, 0.5 vinyls per 1000 carbon atoms, more preferably less than, or equal to, 0.3 vinyls per 1000 carbon atoms, and wherein the high molecular weight (HMW) ethylene-based polymer has a density from 0.925 to 0.950 g/cc.

In one embodiment, the blend has a high density fraction (the weight fraction of the one or more peaks located at greater than 80° C. in the ATREF curve) greater than, or equal to, 70 percent, more preferably greater than, or equal to, 73 percent, and most preferably greater than or equal to 75 percent (based on the total peak area under the ATREF curve).

In one embodiment, the blend has a purge fraction (the weight fraction of the polymer which remains in solution in the temperature range 25° C. to 30° C., as determined by ATREF) less than, or equal to, 20 percent, more preferably less than or equal to 15 percent, and most preferably less than or equal to 12 percent (based on the total peak area under the ATREF curve).

In one embodiment, the composition has a molecular weight distribution ($M_w/M_n$) from 8 to 30, preferably from 10 to 25, as determined by high temperature GPC equipped with an infrared detector.

In one embodiment, the composition has a molecular weight distribution ($M_w/M_n$) from 8 to 25, preferably from 10 to 20, as determined by high temperature GPC, equipped with an infrared detector.

In one embodiment, the composition has a density from 0.945 to 0.965 g/cc, preferably from 0.950 to 0.965 g/cc, more preferably from 0.955 to 0.960 g/cc.

In one embodiment, the composition has a melt index $I_2$ (190° C., 2.16 kg weight)) from 0.1 to 3 g/10 min, preferably from 0.1 to 1 g/10 min.

In one embodiment, the composition has a high flow melt index $I_{21}$ (190° C., 21.6 kg weight) from 10 to 40 g/10 min, preferably from 20 to 35 g/10 min, more preferably from 22 to 32 g/10 min.

In one embodiment, the HMW ethylene-based polymer has a high flow melt index, $I_{21}$, from 0.1 to 10 g/10 min, preferably from 0.3 to 5 g/10 min, and more preferable from 0.5 to 2 g/10 min.

In one embodiment, LMW ethylene-based polymer has a melt index, $I_2$, from 300 to 900 g/10 min, preferably from 350 to 850 g/10 min, and more preferable from 400 to 800 g/10 min.

In one embodiment, the HMW ethylene-based polymer has a density from 0.930 to 0.945 g/cc, and preferably from 0.935 to 0.940 g/cc.

In one embodiment, the LMW ethylene-based polymer has a density from 0.958 to 0.980 g/cc, preferably from 0.965 to 0.975 g/cc, and more preferably from 0.968 to 0.973 g/cc.

In one embodiment, the HMW ethylene-based polymer and the LMW ethylene-based polymer comprise greater than 85 weight percent, preferably greater than 90 weight percent, and more preferably greater than 95 weight percent of the total weight of the composition.

An inventive composition may have a combination of two or more embodiments as described herein.

The invention also provides an article comprising at least one component formed from an inventive composition.

In one embodiment, the article is an injection blow molded article.

In one embodiment, the article has an ESCR (100% Igepal), F50 value greater than 500 hours, preferably greater than 700 hours, and more preferably greater than 1000 hours.

In one embodiment, the article has a good water vapor barrier, wherein the water vapor transmission rate (WVTR) is less than 0.7 g-mil/100 in$^2$×day Polymer Composition In a preferred embodiment, the inventive composition comprises a blend containing a high molecular weight ethylene-based polymer and a low molecular weight polyethylene-based polymer.

The polymer compositions may be made by physical or in situ blending. In one embodiment, the polymer composition has a density greater than 0.945 g/cm$^3$ and melt flow rate, $I_2$ (190° C., 2.16 kg weight) greater than 0.1 dg/min, said polymer composition comprising at least a first and a second polymer of which the first polymer is (a) a HMW polymer with density less than or equal to 0.950 g/cc and high load melt index, $I_{21}$, (190° C., 21.6 kg weight) greater than or equal to 0.1 dg/min or (b) a LMW polymer with density greater than or equal to 0.958 g/cc and melt index, $I_2$, (190° C., 2.16 kg weight) greater than or equal to 400 dg/min.

Each inventive polymer composition can be prepared in situ, in a single reactor or in more than one reactor configuration. If the polymer composition is prepared in situ, in a dual reactor configuration, the polymer made in the first reactor can be either the HMW polymer or the LMW polymer as defined above. The polymer in the second reactor has a density and melt flow rate such that the overall density and melt flow rate of the composition are met. Typically, if in the first reactor, a HMW polymer is made, in the second reactor relatively little or no comonomer is used, and relatively high hydrogen concentration is used, to obtain the overall melt flow rate and density of the final composition. Similar polymerization processes are described in WO2004101674A, incorporated herein by reference.

In one embodiment, the composition has a density greater than, or equal to, 0.945 g/cc, preferably greater than, or equal to, 0.950 g/cc, and more preferably greater than, or equal to, 0.955 g/cc. In another embodiment, the composition has a density less than, or equal to, 0.965 g/cc, preferably less than, or equal to, 0.960 g/cc. In another embodiment, the composition has a density from 0.945 to 0.965 g/cc, and preferably from 0.950 to 0.962 g/cc, and more preferably from 0.955 to 0.960 g/cc.

In another embodiment, the composition has a high load melt index ($I_{21}$) less than, or equal to, 50 g/10 min, preferably less than, or equal to, 40 g/10 min, and more preferably less than, or equal to, 30 g/10 min. In another embodiment, the composition has a high load melt index ($I_{21}$) greater than, or equal to, 10 g/10 min, preferably greater than, or equal to, 15 g/10 min, and more preferably greater than, or equal to, 20 g/10 min. In another embodiment, the composition has a high load melt index ($I_{21}$) from 10 to 50 g/10 min, preferably from 15 to 40 g/10 min, and more preferably from 20 to 30 g/10 min.

In another embodiment, the composition has a melt index ($I_2$) less than, or equal to, 1.0 g/10 min, preferably less than, or equal to, 0.7 g/10 min, and more preferably less than, or equal to, 0.5 g/10 min. In another embodiment, the composition has a melt index ($I_2$) greater than, or equal to, 0.1 g/10 min, and preferably greater than, or equal to, 0.2 g/10 min. In another embodiment, the composition has a melt index ($I_2$) from 0.1 to 1.0 g/10 min, preferably from 0.2 to 0.7 g/10 min, and more preferably from 0.2 to 0.5 g/10 min.

In one embodiment, the composition has an I21/I2 ratio from 60 to 110, preferably from 70 to 100, and more preferably from 75 to 95.

In another embodiment, the composition has a molecular weight distribution, characterized by the ratio ($M_w/M_n$) of the weight average molecular weight ($M_w$) to the number average molecular weight ($M_n$), greater than, or equal to, 10, preferably greater than, or equal to, 12, or greater than, or equal to, 15, as determined by high temperature GPC (Gel Permeation Chromatography) equipped with an infrared detector.

In another embodiment, the composition has a molecular weight distribution less than, or equal to, 35, preferably less than, or equal to, 20, and more preferably less than, or equal to, 25, as determined by high temperature GPC (Gel Permeation Chromatography), equipped with an infrared detector.

In another embodiment, the high molecular weight ethylene-based polymer is present in an amount greater than, or equal to, 40 weight percent, or greater than, or equal to, 45 weight percent, or greater than, or equal to, 50 weight percent, based on the sum weight of the high molecular weight ethylene-based polymer and the low molecular weight ethylene-based polymer. In another embodiment, the low molecular weight ethylene-based polymer is present in an amount less than, or equal to, 60 weight percent, or less than, or equal to, 55 weight percent, and or less than, or equal to, 50 weight percent, based on the sum weight of the high molecular weight ethylene-based interpolymer and the low molecular weight ethylene-based polymer. In another embodiment, the weight ratio of the high molecular weight component to the low molecular weight component (HMW/LMW) is from 40/60 to 70/30, preferably from 51/49 to 67/33, and more preferably from 52/48 to 65/35.

In a preferred embodiment, the composition comprises a blend, wherein the blend comprises at least one high molecular weight (HMW) ethylene-based polymer, and at least one low molecular weight (LMW) ethylene-based polymer, and
wherein the blend has an unsaturation level, as determined by IR, and expressed as vinyls per 1000 carbon atoms, less than, or equal to, 0.5 vinyls per 1000 carbon atoms, more preferably less than, or equal to, 0.3 vinyls per 1000 carbon atoms.

In one embodiment, the blend has a high density fraction, the weight fraction of the highest temperature peak, as determined by ATREF, greater than, or equal to, 70 percent, more preferably greater than, or equal to, 73 percent, and most preferably greater than or equal to 75 percent.

In one embodiment, the blend has a purge fraction, the weight fraction of the polymer which remains in solution in the temperature range 25° C. to 30° C., as determined by ATREF, less than, or equal to, 20 percent, more preferably less than or equal to 15 percent, and most preferably less than or equal to 12 percent.

The blend may comprise a combination of two or more embodiments as described herein. Additional features of the blend components are described below.

A composition may comprise a combination of two or more embodiments as described herein.

The components of a composition or blend may comprise a combination of two or more embodiments as described herein.

The High Molecular Weight (HMW) Component

In one embodiment, the high molecular weight ethylene-based polymer has a density less than, or equal to, 0.950 g/cc, preferably less than, or equal to, 0.945 g/cc, more preferably less than, or equal to, 0.940 g/cc. In a further embodiment, the high molecular weight ethylene-based polymer is an ethylene-based interpolymer.

In another embodiment, the high molecular weight ethylene-based polymer has a density greater than, or equal to, 0.925 g/cc, preferably greater than, or equal to, 0.930 g/cc, more preferably greater than, or equal to, 0.935 g/cc. In a further embodiment, the high molecular weight ethylene-based polymer is an ethylene-based interpolymer.

In another embodiment, the density of the high molecular weight ethylene-based polymer is from 0.925 to 0.950 g/cc, and preferably from 0.930 to 0.945 g/cc, and more preferably from 0.935 to 0.940 g/cc. In a further embodiment, the high molecular weight ethylene-based polymer is an ethylene-based interpolymer.

In another embodiment, the high molecular weight ethylene-based polymer has a high load melt index, $I_{21}$ (190° C., 21.6 kg weight), less than, or equal to, 10 g/10 min, preferably less than, or equal to, 5 g/10 min, and more preferably less than, or equal to, 2 g/10 min. In a further embodiment, the high molecular weight ethylene-based polymer is an ethylene-based interpolymer.

In another embodiment, the high molecular weight ethylene-based polymer has a high flow melt index ($I_{21}$) greater than, or equal to, 0.1 g/10 min, preferably greater than, or equal to, 0.3 g/10 min, and more preferably greater than, or equal to, 0.5 g/10 min. In a further embodiment, the high molecular weight ethylene-based polymer is an ethylene-based interpolymer.

In another embodiment, the high molecular weight ethylene-based polymer has a high load melt index ($I_{21}$) from 0.1 to 10 g/10 min, preferably from 0.3 to 5 g/10 min, and more preferably greater from 0.5 to 2 g/10 min. In a further embodiment, the high molecular weight ethylene-based polymer is an ethylene-based interpolymer.

As understood in the art, the higher molecular weight component has a higher molecular weight than the lower molecular weight component, as determined by the polymerization conditions of each component, melt index, Gel Permeation Chromatography and/or other methods known in the art.

In another embodiment, the high molecular weight ethylene-based polymer is an ethylene/α-olefin interpolymer. In a preferred embodiment, the α-olefin is a C3-C20 α-olefin, preferably a C4-C20 α-olefin, more preferably a C4-C12 α-olefin, and even more preferably a C4-C8 α-olefin, and most preferably C6-C8 α-olefin.

Suitable α-olefins include those containing 3 to 20 carbon atoms (C3-C20), preferably 4 to 20 carbon atoms (C4-C20), more preferably 4 to 12 carbon atoms (C4-C12) and even more preferably 4 to 8 carbon atoms (C4-C8) and most preferably C6-C8. The α-olefins include, but are not limited to, propylene 1-butene, 1-pentene, 1-hexene, 4-methyl-1-pentene, 1-heptene, and 1-octene. Preferred α-olefins include propylene, 1-butene, 1-hexene, and 1-octene. Especially preferred α-olefins include 1-hexene and 1-octene, and more preferably 1-hexene. The α-olefin is desirably a C3-C8 α-olefin, and more desirably a C4-C8 α-olefin, and most desirably C6-C8 α-olefin.

Interpolymers include ethylene/butene-1 (EB) copolymers, ethylene/hexene-1 (EH) copolymers, ethylene/octene-1 (EO) copolymers, ethylene/alpha-olefin/diene modified (EAODM) interpolymers such as ethylene/propylene/diene modified (EPDM) interpolymers and ethylene/propylene/octene terpolymers. Preferred copolymers include EB, EH and EO copolymers, and most preferably EH and EO copolymers.

In a preferred embodiment, the high molecular weight ethylene-based interpolymer is an ethylene/1-hexene interpolymer.

The high molecular weight ethylene-based polymer may comprise a combination of two or more embodiments as described herein.

The Low Molecular Weight (LMW) Component

In one embodiment, the low molecular weight ethylene-based polymer has a density greater than, or equal to, 0.958 g/cc, preferably greater than, or equal to, 0.965 g/cc, and more preferably greater than, or equal to, 0.968 g/cc. In a further embodiment, the low molecular weight ethylene-based polymer is an ethylene-based interpolymer. In another embodiment, the low molecular weight ethylene-based polymer is a polyethylene homopolymer.

In one embodiment, the low molecular weight ethylene-based polymer has a density less than, or equal to, 0.980 g/cc, preferably less than, or equal to, 0.975 g/cc, and more preferably less than, or equal to, 0.973 g/cc. In a further embodiment, the low molecular weight ethylene-based polymer is an ethylene-based interpolymer. In another embodiment, the low molecular weight ethylene-based polymer is a polyethylene homopolymer.

In one embodiment, the low molecular weight ethylene-based polymer has a density from 0.958 to 0.980 g/cc, preferably from 0.965 to 0.975 g/cc, and more preferably from 0.968 to 0.973 g/cc. In a further embodiment, the low molecular weight ethylene-based polymer is an ethylene-based interpolymer. In another embodiment, the low molecular weight ethylene-based polymer is a polyethylene homopolymer.

In one embodiment, the low molecular weight ethylene-based polymer has a melt index, $I_2$ (190° C., 2.16 kg weight), greater than, or equal to, 300 g/10 min, preferably greater than, or equal to, 350 g/10 min, and more preferably greater than, or equal to, 400 g/10 min. In a further embodiment, the low molecular weight ethylene-based polymer is an ethylene-based interpolymer. In another embodiment, the low molecular weight ethylene-based polymer is a polyethylene homopolymer.

In another embodiment, the low molecular weight ethylene-based interpolymer has a melt index, $I_2$, less than, or equal to, 900 g/10 min, preferably less than, or equal to, 850 g/10 min, and more preferably less than, or equal to, 800 g/10 min. In a further embodiment, the low molecular weight ethylene-based polymer is an ethylene-based interpolymer. In another embodiment, the low molecular weight ethylene-based polymer is a polyethylene homopolymer.

In another embodiment, the low molecular weight ethylene-based polymer has a melt index ($I_2$) from 300 to 900 g/10 min, preferably from 350 to 850 g/10 min, more preferably from 400 to 800 g/10 min. In a further embodiment, the low molecular weight ethylene-based polymer is an ethylene-based interpolymer. In another embodiment, the low molecular weight ethylene-based polymer is a polyethylene homopolymer.

In another embodiment, the low molecular weight ethylene-based polymer is an ethylene/α-olefin interpolymer. In a preferred embodiment, the α-olefin is a C3-C20 α-olefin, a preferably a C4-C20 α-olefin, and more preferably a C4-C12 α-olefin, and even more preferably a C4-C8 α-olefin and most preferably C6-C8 α-olefin. The α-olefins include, but are not limited to, propylene 1-butene, 1-pentene, 1-hexene, 4-methyl-1-pentene, 1-heptene, and 1-octene. Preferred α-olefins include propylene, 1-butene, 1-hexene, and 1-octene. Especially preferred α-olefins include 1-hexene and 1-octene, and more preferably 1-hexene. The α-olefin is desirably a C3-C8 α-olefin, and more desirably a C4-C8 α-olefin and most desirably a C6-C8 α-olefin.

Interpolymers include ethylene/butene-1 (EB) copolymers, ethylene/hexene-1 (EH) copolymers, ethylene/octene-1 (EO) copolymers, ethylene/alpha-olefin/diene modified (EAODM) interpolymers such as ethylene/propylene/diene modified (EPDM) interpolymers and ethylene/propylene/octene terpolymers. Preferred copolymers include EB, EH and EO copolymers, and most preferred copolymers are EH and EO copolymers.

In one embodiment, the low molecular weight ethylene-based polymer is an ethylene/1-hexene copolymer.

In another embodiment, the low molecular weight ethylene-based polymer is a polyethylene homopolymer.

The low molecular weight ethylene-based polymer may comprise a combination of two or more embodiments as described herein.

Additives

The inventive compositions may contain one or more additional components or additives. Suitable additional components include, for example, other polymers, fillers or additives, with the proviso that these additional components do not adversely interfere with the desired advantageous properties of the compositions of the invention. Rather, the additional components are selected, such as to support the advantageous properties of an inventive composition and/or to support, or enhance, the composition's particular suitability for a desired application. "Other polymers," comprised in the composition of the invention, means polymers which do not qualify as the high molecular weight ethylene-based polymer or the low molecular weight ethylene-based polymer, as defined herein. Advantageously, such polymers are compatible with the inventive composition.

Additives include, but are not limited to, processing aids, catalyst neutralizers, acid neutralizers, UV stabilizers, antioxidants, process stabilizers, metal de-activators, additives to improve oxidative or chlorine resistance, pigments or colorants, nucleating agents, fatty acid stearates, fluoroelastomers, agents to modify impact properties of the polymer, and combinations thereof.

In one embodiment, an inventive composition comprises one or more additives selected from hindered amines, hindered phenols, metal deactivators, UV absorbers, phosphites, acid neutralizers, processing aids, and combinations thereof. In a further embodiment, one or more additives, and combinations thereof, are selected from CYASORB 3529, IRGANOX 1010, IRGANOX 1076, IRGANOX 1330, IRGANOX MD1024, IRGAFOS 168, and DYNAMAR FX 5911.

Fabricated Articles

The compositions of the present invention can be used to manufacture an article, or one or more components of an article. Suitable articles include, but are not limited to, containers, such as pharmaceutical containers, cosmetic containers, household containers, small sized containers (16 oz or less), and automotive parts.

Articles, or one or more components thereof, manufactured from the inventive composition have exceptional ESCR, stiffness, and water vapor barrier properties.

DEFINITIONS

Any numerical range recited herein, includes all values from the lower value and the upper value, in increments of one unit, provided that there is a separation of at least two units between any lower value and any higher value. As an example, if it is stated that a compositional, physical or other property, such as, for example, molecular weight, melt index, is from 100 to 1,000, it is intended that all individual values, such as 100, 101, 102, etc., and sub ranges, such as 100 to 144, 155 to 170, 197 to 200, etc., are expressly enumerated in this specification. For ranges containing values which are less than one, or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this application. Numerical ranges have been recited, as discussed herein, in reference to density, melt index, weight percent of component and other properties.

The term "polymer" is used herein to indicate, a homopolymer, a copolymer, or a terpolymer. The term "polymer" as used herein includes interpolymers such as, for example, those made by the copolymerization of ethylene with C3-C10 alpha olefins, or polypropylene with ethylene and/or C4-C10 alpha olefins.

The term "interpolymer," as used herein, refers to polymers prepared by the polymerization of at least two different types of monomers. The generic term interpolymer thus includes copolymers, employed to refer to polymers prepared from two different types of monomers, and polymers prepared from more than two different types of monomers.

The term "ethylene-based polymer," as used herein, refers to a polymer that comprises, in polymerized form, a majority weight percent ethylene (based on the weight of polymer), and, optionally, one or more additional comonomers.

The term "ethylene-based interpolymer," as used herein, refers to an interpolymer that comprises, in polymerized form, a majority weight percent ethylene (based on the weight of interpolymer), and one or more additional comonomers.

The term "ethylene/α-olefin interpolymer," as used herein, refers to an ethylene-based interpolymer that comprises, in polymerized form, a majority weight percent ethylene (based on the weight of interpolymer), an α-olefin, and optionally, one or more additional comonomers.

The terms "blend" or "polymer blend," as used herein, mean a blend of two or more polymers. Such a blend may or may not be miscible. Such a blend may or may not be phase separated. Such a blend may or may not contain one or more domain configurations, as determined from transmission electron microscopy, light scattering, x-ray scattering, and other methods known in the art.

The terms "comprising", "including", "having" and their derivatives are not intended to exclude the presence of any additional component, step or procedure, whether or not the same is specifically disclosed. In order to avoid any doubt, all compositions claimed through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

TEST METHODS

Density

Resin density was measured by the Archimedes displacement method, ASTM D 792-00, Method B, in isopropanol. Specimens were measured within one hour of molding, after conditioning in the isopropanol bath, at 23° C., for eight minutes, to achieve thermal equilibrium prior to measurement. The specimens were compression molded according to ASTM D-4703-00, Annex A, with a five minutes initial heating period at about 190° C., and a 15° C./min cooling rate per Procedure C. The specimen was cooled to 45° C. in the press, with continued cooling until "cool to the touch."

Melt Flow Rate by Extrusion Plastomer

Melt flow rate measurements were performed according to ASTM D-1238-04, Condition 190° C./2.16 kg, Condition 190° C./5 kg and Condition 190° C./21.6 kg, which are known as $I_2$, $I_5$ and $I_{21}$, respectively. Melt flow rate is inversely proportional to the molecular weight of the polymer. Thus, the higher the molecular weight, the lower the melt flow rate, although the relationship is not linear. Melt Flow Ratio (MFR) is the ratio of melt flow rate ($I_{21}$) to melt flow rate ($I_2$), unless otherwise specified.

Environmental Stress Crack Resistance (ESCR)

The resin environmental stress crack resistance (ESCR) was measured per ASTM-D 1693-01, Method B, with either 10% or 100% Igepal CO-630 (vendor Rhone-Poulec, NJ). Specimens were molded according to ASTM D 4703-00, Annex A, with a five-minute, initial heating period at about 190° C., and a 15° C./min cooling rate per Procedure C. The specimen was cooled to 45° C. in the press, with continued cooling until "cool to the touch."

In the ESCR test, the susceptibility of a resin to mechanical failure by cracking is measured under constant strain conditions, and in the presence of a crack accelerating agent such as, soaps, wetting agents, and the like. Per ASTM-D 1693-01 Method B, measurements were carried out on notched specimens, in a 100% by volume Igepal CO-630 aqueous solution, maintained at 50° C. Ten specimens were evaluated per measurement. The ESCR value of the resin was reported as the F50 value, the calculated 50 percent failure time from the probability graph.

Gel Permeation Chromatography (GPC)

Polymer molecular weight was characterized by high temperature, triple detector, Gel Permeation Chromatography (3D-GPC). The chromatographic system consisted of a Waters (Millford, Mass.), "150° C. high temperature" chromatograph, equipped with Precision Detectors (Amherst, Mass.) 2-angle laser light scattering detector, Model 2040, and a 4-capillary differential viscometer detector, Model 150R, from Viscotek (Houston, Tex.). The 15° angle of the light scattering detector was used for calculation purposes. Concentration was measured via an infra-red detector (IR4) from PolymerChar, Valencia, Spain.

Data collection was performed using Viscotek TriSEC software version 3, and a 4-channel Viscotek Data Manager DM400. The system was equipped with an on-line solvent degas device from Polymer Laboratories. The carousel compartment was operated at 150° C., and the column compartment was operated at 150° C. The columns were four Polymer Lab Mix-A 30 cm, 20 micron columns. The polymer solutions can be prepared in either 1,2,4 trichlorobenzene (TCB) or decahydronapthalene (decalin). The inventive and comparative reference samples were prepared in TCB. The samples were prepared at a concentration of 0.1 grams of polymer sample in 50 ml of solvent. The chromatographic solvent and the sample preparation solvent contained 200 ppm of butylated hydroxytoluene (BHT). Both solvent sources were nitrogen sparged. Polyethylene samples were stirred gently at 160° C. for four hours. The injection volume was 200 μl, and the flow rate was 1.0 ml/minute.

In order to monitor the deviations over time, which may contain an elution component (caused by chromatographic changes), and a flow rate component (caused by pump changes), a late eluting narrow peak is generally used as a "flow rate marker peak." A flow rate marker was therefore established, based on a decane flow marker dissolved in the eluting sample prepared in TCB. This flow rate marker was used to linearly correct the flow rate for all samples by alignment of the decane peaks. Any changes in the time of the marker peak are then assumed to be related to a linear shift in both flow rate and chromatographic slope.

Calibration of the GPC column set was performed with 21 narrow molecular weight distribution polystyrene standards. The standards were purchased from Polymer Laboratories (now a part of Varian Inc.), Shropshire, UK. The molecular weights of the standards ranged from 580 to 8,400,000, and were arranged in six "cocktail" mixtures, with at least a decade of separation between individual molecular weights.

The polystyrene standard peak molecular weights were converted to polyethylene molecular weights using the following equation (as described in Williams and Ward, J. Polym. Sci., Polym. Let., 6, 621 (1968)):

$$M\text{polyethylene} = A \times (M\text{polystyrene})^B \quad (1A),$$

where M is the molecular weight, A has a value of 0.39 and B is equal to 1.0.

A first order polynomial was used to fit the respective polyethylene-equivalent calibration points.

The total plate count of the GPC column set was performed with Eicosane (prepared at 0.04 g in 50 milliliters of TCB, and dissolved for 20 minutes with gentle agitation.) The plate count and symmetry were measured on a 200 microliter injection according to the following equations:

$$\text{PlateCount} = 5.54 * (\text{RV at Peak Maximum}/(\text{Peak width at ½ height}))^2 \quad (2A),$$

where RV is the retention volume in milliliters, and the peak width is in milliliters.

$$\text{Symmetry} = (\text{Rear peak width at one tenth height} - \text{RV at Peak maximum})/(\text{RV at Peak Maximum} - \text{Front peak width at one tenth height}) \quad (3A),$$

where RV is the retention volume in milliliters, and the peak width is in milliliters.

The plate count for the chromatographic system (based on Eicosane as discussed previously) should be greater than 22,000, and symmetry should be between 1.00 and 1.12.

The Systematic Approach for the determination of multi-detector offsets was done in a manner consistent with that published by Balke, Mourey, et. al [Mourey and Balke, Chromatography Polym. Chpt 12, (1992) and Balke, Thitiratsakul, Lew, Cheung, Mourey, Chromatography Polym. Chpt 13, (1992)], optimizing dual detector log molecular weight results from a Dow linear polyethylene homopolymer of 115,000 g/mol molecular weight, which was measured in reference to NIST polyethylene homopolymer standard 1475, to the narrow standard column calibration results from the narrow standards calibration curve using in-house software. The molecular weight data for off-set determination was obtained in a manner consistent with that published by Zimm [Zimm, B. H., J. Chem. Phys., 16, 1099 (1948)] and Kratochvil [Kratochvil, P., Classical Light Scattering from Polymer Solutions, Elsevier, Oxford, N.Y. (1987)]. The overall injected concentration, used for the determination of the molecular weight, was obtained from the sample infra-red area, and the infra-red detector calibration from the Dow linear polyethylene homopolymer of 115,000 molecular weight. The chromatographic concentrations were assumed low enough to eliminate addressing 2nd Virial coefficient effects (concentration effects on molecular weight).

The calculations of Mn, Mw, and Mz based on GPC results using the IR4 detector were determined from the following equations:

$$\overline{Mn} = \frac{\sum_i IR_i}{\sum_i (IR_i / M\text{calibration}_i)}, \quad (4A)$$

$$\overline{Mw} = \frac{\sum_i (IR_i * M\text{cal}_i)}{\sum_i IR_i}, \quad (5A)$$

$$\overline{Mz} = \frac{\sum_i (IR_i * M\text{cal}_i^2)}{\sum_i (IR_i * M\text{cal}_i)} \quad (6A)$$

Where, equations 4A, 5A, and 6A are calculated from polymers prepared in solutions of TCB.

The weight percent of polymer fraction with molecular weight less than 3000 g/mole was calculated by determining the area fraction under the molecular weight distribution curve less than 3000 g/mole. The molecular weight distribution curve was obtained from Conventional GPC measurements and equation (1A) above (where the total area of the molecular weight distribution curve is defined as 1).

In addition to the above calculations, a set of alternative Mw, Mz and MZ+1 [Mw (abs), Mz (abs), Mz (BB) and MZ+1 (BB)] values were also calculated with the method proposed by Yau and Gillespie, Polymer, 42, 8947-8958 (2001), and determined from the following equations:

$$\overline{Mw}(\text{abs}) = K_{LS} * \frac{\sum\limits_i (LS_i)}{\sum\limits_i (IR_i)}, \quad (8A)$$

where, $K_{LS}$=LS-MW calibration constant, $$\overline{Mz}(\text{abs}) = \frac{\sum\limits_i IR_i * (LS_i/IR_i)^2}{\sum\limits_i IR_i * (LS_i/IR_i)}, \quad (9A)$$

$$\overline{Mz}(BB) = \frac{\sum\limits_i (LS_i * Mcalibration_i)}{\sum\limits_i (LS_i)}, \quad (10A)$$

$$\overline{M_{z+1}}(BB) = \frac{\sum\limits_i (LS_i * Mcalibration_i^2)}{\sum\limits_i (LS_i * Mcalibration_i)}, \quad (11A)$$

where LSi is the 15 degree LS signal, and the Mcalibration uses equation 1A, and the LS detector alignment is as described previously.

ATREF-DV Method

In "Analytical Temperature Rising Elution Fractionation Analysis" (as described in U.S. Pat. No. 4,798,081 and abbreviated herein as "ATREF"), the composition to be analyzed is dissolved in a suitable hot solvent (for example, 1,2,4 trichlorobenzene), and allowed to crystallized in a column containing an inert support (for example, stainless steel shot) by slowly reducing the temperature. The column is equipped with both an infra-red detector and a differential viscometer (DV) detector. An ATREF-DV chromatogram curve is then generated by eluting the crystallized polymer sample from the column, by slowly increasing the temperature of the eluting solvent (1,2,4 trichlorobenzene). The ATREF-DV method is described in further detail in WO 99/14271, the disclosure of which is incorporated herein by reference. International Publication WO 99/14271 also describes a suitable deconvolution technique for multicomponent polymer blend compositions. The ATREF curve is also frequently called the short chain branching distribution (SCBD), since it indicates how evenly the comonomer (for example, hexene) is distributed throughout the sample, in that as elution temperature decreases, comonomer content increases. The refractive index detector provides the short chain distribution information, and the differential viscometer detector provides an estimate of the viscosity average molecular weight. A discussion of the procedure can be found in L. G. Hazlitt, J. Appl. Polym. Sci.: Appl. Poly. Symp., 45, 25-37 (1990), which is incorporated herein by reference.

Fractionation by Analytical Temperature Rising Elution Fractionation—Differential Viscometry, ATREF-DV, was performed on the polymer samples, using the methods and apparatus described by Wild[1] and Hazlitt[2,3]. The column was constructed from ⅛"×18" thin-wall stainless-steel tubing, and packed with 0.023"×0.023" stainless-steel shot from Pellets Inc. (Tonawanda, N.Y.). The column had a 1.5 ml interstitial volume.

[1] L. Wild, T. R. Ryle, D. C. Knobeloch, and I. R. Peat, Journal of Polymer Science: Polymer Physics Edition, Vol. 20, 441-455 (1982).
[2] L. Hazlitt and D. Moldovan, U.S. Pat. No. 4,798,081, 1989.
[3] L. Hazlitt, Journal of Applied Polymer Science: Applied Polymer Symposia, 45, 25-37 (1990).

A controlled GC (Gas Chromatography) oven was used to affect the temperature profiles. Two additional ovens provided high temperature thermal control, respectively, for the sample loading chamber, and a value section, which contained various valves for directing solvent flow. These later two ovens were maintained at 130° C.

As discussed above, the polymer sample was dissolved in a suitable solvent, such as 1,2,4-trichlorobenzene (containing 180 ppm BHT as an antioxidant) to form a polymer solution. The initial polymer concentration was between 50 mg and 200 mg in 50 ml (at room temperature) of the 1,2,4-trichlorobenzene (TCB), and this concentration was adjusted to accommodate the sharpness of the eluting peaks, so that it would not exceed the maximum response for the concentration and viscosity detection in the data collection hardware. Such adjustments can be made by one skilled in the art.

The polymer solution was deposited on the stainless steal column, at a column temperature of 130° C. Once deposited on the column, the temperature of the column was decreased at a maintained rate of −0.1° C./min, to a final column temperature of about 20° C. Next, the elution temperature was increased at a rate of 1.0° C./min, from 20° C. to 122° C. The solvent elution also began at this time, and the solvent (1,2,4-trichlorobenzene containing 180 ppm BHT as an antioxidant) flow rate was 1.0 ml/min. The elution was directed, via heated transfer lines, to, first, an IR-4 infrared detector, second, PD2040 low angle laser light scattering (LALLS) detector, and finally a Model H502C differential viscometer. Each detector was maintained at a temperature of 140° C. A reservoir for solvent waste was provided after the sequence of detectors. Data was collected using a computer.

Rheology

The sample was compression molded into a disk for rheology measurement. The disks were prepared by pressing the samples into 0.071" (1.8 mm) thick plaques, which were subsequently cut into one inch (25.4 mm) disks. The compression molding procedure was as follows: 365° F. (185° C.) for 5 min at 100 psi (689 kPa); 365° F. (185° C.) for 3 min at 1500 psi (10.3 MPa); cooling at 27° F. (15° C.)/min to ambient temperature (about 23° C.).

The resin rheology was measured on the ARES I (Advanced Rheometric Expansion System) Rheometer. The ARES is a strain controlled rheometer. A rotary actuator (servomotor) applies shear deformation, in the form of strain to a sample. In response, the sample generates torque, which is measured by the transducer. Strain and torque are used to calculate dynamic mechanical properties, such as modulus and viscosity. The viscoelastic properties of the sample were measured in the melt using a 25 mm parallel plate set up, at constant strain (5%), and temperature (190° C.), and as a function of varying frequency (range 500 s$^{-1}$ to 0.01 s$^{-1}$). The storage modulus (G'), loss modulus (G"), tan delta, and complex viscosity (eta*) of the resin were determined using Rheometrics Orchestrator software (v. 6.5.8).

Structural Characterization

The vinyl/1000C, and trans vinyl/1000C content was determined by ASTM D-6248-98 (reapproved 2004); and the methyl groups/1000C was determined by ASTM D2238-92 (reapproved 1999). The resin pellets were compression molded into films, on CARVER Hydraulic Press, Model No. 2730-4 (temperature controller set to temperature in range from 150° C. to 180° C.; pressure was about 30,000 pounds). MYLAR or aluminum foil was used on the molding tray to prevent the film from sticking to the tray or from being contaminated. The pressed film thickness was either 0.25 mm or 0.1425 mm.

Water Vapor Transmission Rate (WVTR)

The WVTR test was conducted according to ASTM F1249-90. Samples were prepared in duplicate, and thickness measurements performed on each sample. Water vapor transmission testing was conducted at 37.8° C. and 100 percent relative humidity. Results were normalized to the thickness of each sample.

CRYSTAF

Crystallization analysis fractionation was performed using a CRYSTAF 200 unit from Polymer Char, Spain. The samples were dissolved, at 160° C., in 1,2,4 tricholorbenzene (0.66 mg/mL) for 1 hour, and stabilized at 95° C. for 45 minutes. The sampling temperature ranged from 95 to 30° C., at a cooling rate of 0.2° C./min. An infrared detector was used to measure the polymer solution concentrations. The cumulative soluble concentration was measured as the polymer crystallizes, while the temperature was decreased. The analytical derivative of the cumulative profile reflects the short chain branching distribution of the polymer. A discussion of the procedure can be found in B. Monrabal, "Crystallization Analysis Fractionation: A New Technique for the Analysis of Branching Distribution in Polyolefins", J. Appl. Polym. Sci., 52, 491-505 (1994), which is incorporated herein by reference.

EXAMPLES OF THE INVENTION

The IBM (Injection Blow Molding) process typically consists of three main steps: injection, blowing, and ejection. An extruder barrel and screw assembly is used to melt the polymer. The molten polymer is fed into a manifold, where it is injected through nozzles into a hollow, heated pre-form mold. The pre-form mold is clamped around a mandrel (the core rod), which forms the internal shape of the pre-form. The pre-form consists of a fully formed bottle/jar neck with a thick tube of polymer attached, which will form the body. The pre-form mold opens, and the core rod is rotated and clamped into the hollow, chilled blow mold. The core rod opens and allows compressed air into the pre-form, which inflates the pre-form to the finished article shape. After a cooling period, the blow mold opens, and the core rod is rotated to the ejection position. The pre-form and blow mold can have many cavities, typically three to sixteen, depending on the article size and the required output. There are three sets of core rods, which allow concurrent pre-form injection, blow molding, and ejection.

The polymer compositions, Inventive Example 1 and Comparative Example A, as shown in Table 1A, were evaluated in an injection blow molding process. Inventive Example 1 resins have been prepared using the process conditions shown in Table 1B. Additional comparative resins include: Comparative Example B, Comparative Example C, and Comparative Example D. The properties of each resin are shown in Tables 2, 3A and 3B.

TABLE 1A

Resin Compositions

| | Properties | Inventive Ex 1 | Comp. Ex A |
|---|---|---|---|
| HMW Component | Flow Index $I_{21}$ (dg/min) | 0.7 | 4 |
| | Density (g/cm$^3$) | 0.938 | 0.934 |
| | Split (% HMW) | 50 | 53 |
| LMW Component | Melt Index $I_2$ (dg/min) | 400 to 800 | 800 to 1000 |
| | Density (g/cm$^3$) | 0.965 to 0.975 | 0.965 to 0.975 |
| Target Values | Flow Index $I_{21}$ (dg/min) | 27 | 100 |
| | Melt Index $I_2$ (dg/min) | 0.33 | 1.5 |
| | MFR ($I_{21}/I_2$) | 82 | 67 |
| | Density (g/cm$^3$) | 0.958 | 0.955 |

Inventive Example 1 was stabilized with one or more stabilizers (antioxidants, 800 ppm) and catalyst neutralizing agent (calcium stearate, 1000 ppm).
Comparative Example A was stabilized with one or more stabilizers (antioxidants, 1000 ppm) and catalyst neutralizing agent (calcium stearate, 600 ppm).

TABLE 1B

| REACTION CONDITIONS (Series) | HMW Reactor | Blend/LMW Reactor |
|---|---|---|
| Temperature, ° C. | 80.0 | 100.0 |
| Total Reactor Pressure, psig | 346 | 395 |
| C2 Partial Pressure, psia | 29.8 | 98.7 |
| H2/C2 Molar Ratio | 0.072 | 1.81 |
| C6/C2 Molar Ratio | 0.014 | 0.000 |
| Catalyst | UCAT ™ J | |
| Cocatalyst | Triethylaluminum | Triethylaluminum |
| Residence Time, hr | 3.5 | 3.2 |

TABLE 2

Resin Properties

| Product | Units | ASTM | Inv. Ex. 1 | Comp. Ex. A | Comp. Ex. B | Comp Ex. C | Comp. Ex. D |
|---|---|---|---|---|---|---|---|
| Process | | | Gas Phase | Gas Phase | Gas Phase | Slurry | Slurry |
| Density | g/cm$^3$ | D792 | 0.9597 | 0.9561 | 0.9533 | 0.9555 | 0.9548 |
| MI ($I_2$) | dg/min | 1238 | 0.3 | 1.43 | 0.32 | 0.31 | 1.27 |
| FI ($I_{21}$) | dg/min | 1238 | 26.1 | 101.7 | 31.6 | 31.6 | 90 |
| ESCR (100% Igepal), F50 | h | D1693-B | >1000 | >2000 | 80 | 35 | 20[†] |

Comp. Ex. C = MARLEX 5502 BN;
Comp. Ex. D = EQUISTAR M5312
[†]Information from technical data sheet

TABLE 3A

Resin Properties

| Product | Method | Inv. Ex. 1 | Comp. Ex. A | Comp. Ex. B | Comp Ex. C | Comp. Ex. D |
|---|---|---|---|---|---|---|
| Methyls per 1000 Carbons | ASTM D2238 | 0.972 | 1.82 | 0.693 | 0.306 | 0.513 |
| Trans per 1000 Carbons | ASTM D6248 | 0 | 0.002 | 0.016 | 0 | 0.013 |
| Vinyls per 1000 Carbons | ASTM D6248 | 0.105 | 0.105 | 1.131 | 0.783 | 0.540 |
| ATREF Data | | | | | | |
| Weight % High Density Fraction Mean ± SD (n = 2) | | 81.5 ± 4.0 | 73.0 ± 0.4 | 78.3 ± 2.0 | 83.7 ± 3.5 | 83.6 ± 0.7 |
| Weight % Purge Mean ± SD (n = 2) | | 8.9 ± 3.5 | 11.7 ± 0.1 | 11.8 ± 2.8 | 9.2 ± 2.6 | 11.1 ± 1.6 |
| Average Mv Mean ± SD (n = 2) | | 88,036 ± 730 | 56,223 ± 1755 | 69,982 ± 4643 | 69,084 ± 5779 | 75,082 ± 1935 |
| Purge Mv Mean ± SD (n = 2) | | 77,606 ± 18654 | 61,683 ± 4938 | 84,970 ± 18130 | 79,408 ± 18328 | 95,484 ± 15777 |
| CRYSTAF Data | | | | | | |
| Peak Temperature 1 | | 69.1 | 66.3 | 63.9 | 66.3 | 58 |
| Peak Temperature 2 | | 77.1 | 70.3 | 67.1 | 75.6 | 66.8 |
| Peak Temperature 3 | | 80.6 | 79.8 | 79.5 | 78.4 | 84.7 |
| Peak Temperature 4 | | 85.2 | 84.4 | 84.2 | 84.9 | 89.4 |
| Area Percent Peak 1 | | 3.6 | 3.8 | 1.6 | 1.2 | 0.4 |
| Area Percent Peak 2 | | 3.4 | 3.2 | 1.5 | 2.2 | 1.4 |
| Area Percent Peak 3 | | 5.1 | 13.9 | 9 | 2.9 | 96.6 |
| Area Percent Peak 4 | | 83.6 | 72.6 | 83.8 | 92 | 0.4 |
| % Non crystallizable fraction | | 1.3 | 1.5 | 1 | 0.1 | 0.2 |

TABLE 3B

Resin Properties Continued

| Product | Inv. Ex. 1 | Comp. Ex. A | Comp. Ex. B | Comp Ex. C | Comp. Ex. D |
|---|---|---|---|---|---|
| Rheology Data | | | | | |
| Complex Eta@0.02 (Pa · s) | 41,044 | 10,257 | 61,533 | 61,957 | 11,903 |
| Complex Eta@0.02/ Complex Eta@200 | 42 | 16 | 72 | 72 | 21 |
| GPC (IR) | | | | | |
| Mn | 9,640 | 8,570 | 11,840 | 16,980 | 14,410 |
| Mw | 147,720 | 117,050 | 107,840 | 122,800 | 106,900 |
| Mz | 673,300 | 636,500 | 436,900 | 638,000 | 514,200 |
| Mw/Mn | 15.3 | 13.7 | 9.1 | 7.2 | 7.4 |
| GPC (LS) | | | | | |
| Mn | 9,817 | 9,016 | 11,945 | 17,805 | 14,513 |
| Mw | 176,560 | 132,590 | 114,650 | 128,630 | 107,030 |
| Mz(BB) | 877,000 | 752,000 | 566,900 | 663,700 | 573,200 |
| Mz(abs) | 872,900 | 739,900 | 549,900 | 675,200 | 546,200 |
| Mz + 1(BB) | 1,752,400 | 1,542,400 | 1,595,300 | 1,688,600 | 1,284,300 |
| Mz/Mw | 4.9 | 5.6 | 4.8 | 5.3 | 5.1 |
| Mw(LS)/Mn(IR) | 18.3 | 15.5 | 9.7 | 7.6 | 7.4 |
| % Wt. fraction of polymer with molecular weight <3500 g/mole | 7.7 | 9.0 | 6.0 | 2.9 | 3.5 |

Injection Blow Molding—First Trial

Inventive Example 1, Comparative Example A, Comparative Example B, and Comparative Example C, as shown in Tables 1-3B above, were injection blow molded on a 78 ton UNILOY MILACRON IBM machine, equipped with a 170 ml round vitamin bottle unit cavity mold. The machine conditions were adjusted using Comparative Example C resin as the control. A sample of Comparative Example C resin with color concentrate was evaluated as a secondary control.

Bottles could not be made with virgin Comparative Ex. B resin. The resin would stick to the core rods, preventing the bottles from being blown. The addition of a color concentrate prevented this resin from sticking to the core rods, thus enabling bottles to be made. The color concentrate acted as a mold release agent. Several grades sold into the IBM market use high levels (0.1 to 1 wt. %) of zinc stearate or other internal mold release agents to prevent resins from sticking to the mold components. Mold release agents such as silicone sprays and pastes can also be used as external mold release agents.

Comparative Example A resulted in screw recovery issues, as well as sticking issues. Bottles could not be produced with virgin Comparative Ex. A, and this resin also required the addition of a color concentrate to prevent sticking, and to allow the production of bottles.

Inventive Ex. 1 processed ideally. Color concentrate was not needed for Inventive Ex. 1, and no changes in the processing conditions were required.

Injection Blow Molding—Second Trial

Shampoo bottles were injection blow molded from Inventive Example 1 (12.6 ton injection blow molding machine). The injection blow molding machine was set up to provide a melt temperature of 460° F., and a cycle time of 7.6 seconds (5.0 second blow time). Process parameters are listed in Table 4. The process cycled with a zero scrap rate, and produced ideal bottles from Inventive Example 1.

Bottles were made on the same equipment using the Comparative Example C resin. Comparative Example C resin began to stick to the core rods, when running the process at the same conditions used for Inventive Example 1. This resulted in partially blown bottles and machine down time. The polymer melt temperature had to be reduced, and the machine cycle time (blow time) increased, in order to produce ideal bottles with Comparative Example C resin.

Bottles were also made on the same equipment with Comparative Example D resin. Comparative Example D resin would occasionally stick to the outside cavity of the injection mold, when running the process at the same conditions used for Inventive Example 1. The injection zone temperatures had to be changed to maintain an even wall thickness distribution. The machine cycle time (blow time) were maintained at the same conditions used for Inventive Example 1.

In summary, Inventive Example 1 processed ideally and had the largest processing window. Comparative Example D had occasional sticking problems. Comparative Example C was difficult to process, and required a longer cycle time in order to produce good quality bottles.

TABLE 4

Injection Blow Molding Process Conditions

|  | Inventive Ex. 1 | Comp. Ex. C | Comp. Ex. D |
|---|---|---|---|
| Overall cycle time (s) | 7.6 | 9.6 | 7.6 |
| Preform delay (s) | 0.5 | 2.5 | 0.5 |
| Low pressure perform (s) | 4.5 | 4.5 | 4.5 |
| Cure time (s) | 1 | 1 | 1 |
| Decompress (s) | 0.7 | 0.9 | 0.7 |
| Blow air delay (s) | 0.2 | 0.2 | 0.1 |
| $1^{st}$ blow air (s) | 5 | 7 | 5.5 |
| Internal cooling (s) | off | 2 | off |
| External cooling (s) | off | 2 | off |
| Eject return delay (s) | off | 2.5 | off |
| Eject forward delay (s) | 0.5 | 0.5 | 0.5 |
| Screw speed forward (rpm) | 260 | 175 | 260 |
| Screw speed reverse (rpm) | 190 | 165 | 190 |
| Injection pressure (psi) | 490 | 460 | 490 |
| $1^{st}$ blow air pressure (psi) | 140 | 140 | 140 |
| Extruder temp feed (° F.) | 370 | 370 | 370 |
| Extruder temp metering (° F.) | 440 | 420 | 450 |

TABLE 4-continued

Injection Blow Molding Process Conditions

|  | Inventive Ex. 1 | Comp. Ex. C | Comp. Ex. D |
|---|---|---|---|
| Nozzle temp (° F.) | 460 | 420 | 460 |
| Manifold temp (° F.) | 460 | 420 | 470 |
| Parison mold shank (° F.) | 240 | 225 | 250 |
| Parison mold neck (° F.) | 120 | 120 | 120 |
| Parison mold center (° F.) | 240 | 225 | 250 |
| Parison mold bottom (° F.) | 150 | 150 | 160 |
| Blow mold shank (° F.) | 240 | 225 | 250 |
| Blow mold neck (° F.) | 57 | 57 | 57 |
| Blow mold center °(F) | 57 | 57 | 57 |
| Blow mold bottom (° F.) | 57 | 57 | 57 |

Surprisingly, it was discovered, in resin evaluations on injection blow molding extrusion equipment, that no "zinc-containing" mold release agent, such as zinc stearate, was required with Inventive Example 1. Also, Inventive Example 1 had the best processing performance versus Comparative Examples A, B, C and D. Furthermore, it was discovered that Inventive Example 1 had the best balance of physical properties, and significantly higher stiffness (see density) and high stress crack resistance versus the comparative resins. The inventive resin also offers better barrier properties for personal care and pharmaceutical packaging applications. This allows bottle fabricators to reduce wall thickness, without compromising performance. In addition, the use of a resin composition with higher density/modulus, optimum balance of high density fraction and low density purge fraction, plus low levels of unsaturated groups, should help to decrease cycle time, and increase production rate, as parts fabricated from inventive compositions will set faster, will not adhere to the mold surfaces, and will be ejected at higher temperatures. It is thought that the lower levels of unsaturation should reduce the potential for oxidation, which, in turn, should lower the surface polarity, and thus, the adhesion, of the polymer composition.

Although the invention has been described in considerable detail in the preceding examples, this detail is for the purpose of illustration, and is not to be construed as a limitation on the invention as described in the following claims.

The invention claimed is:

1. A process for injection blow molding an article, said process comprising injecting into a mold cavity a composition, comprising at least one ethylene-based polymer and less than, or equal to, 1000 ppm of a mold release agent, based on the total weight of the composition, and wherein the composition has a molecular weight distribution (Mw/Mn) from 8 to 30, as determined by high temperature GPC, equipped with an infrared detector; and wherein the composition has a high flow melt index ($I_{21}$) from 22 to 32 g/10 min; and wherein the composition is injected around a core pin to form a pre-form, and the pre-form is inserted into the mold cavity and equilibrated at an elevated temperature; and wherein air is blown into the inner area of the pre-form, and the mold cavity is cooled to form the article, and the article is released from the mold cavity, and wherein the composition comprises at least one high molecular weight (HMW) ethylene-based polymer, and at least one low molecular weight (LMW) ethylene-based polymer, and wherein the LMW ethylene-based polymer has a melt index, $I_2$, from 300 g/10 min to 900 g/10 min; and wherein both the high molecular weight (HMW) ethylene-based polymer, and the low molecular weight (LMW) ethylene-based polymer are prepared using a Ziegler/Natta catalyst.

2. The process of claim 1, wherein the mold release agent is a zinc-containing metal soap or an amide.

3. The process of claim 1, wherein the mold release agent is zinc stearate or erucamide.

4. The process of claim 1, wherein the composition has a molecular weight distribution (Mw/Mn) from 10 to 25, as determined by high temperature GPC equipped with an infrared detector.

5. The process of claim 1, wherein the composition has a density from 0.950 to 0.965 g/cc.

6. The process of claim 1, wherein the composition has a melt index ($I_2$) from 0.1 to 3 g/10 min.

7. The process of claim 1, wherein the HMW ethylene-based polymer has a high flow melt index, $I_{21}$, from 0.1 g/10 min to 10 g/10 min.

8. An article comprising at least one component formed from the process of claim 1.

9. The process of claim 1, wherein the HMW ethylene-based polymer and the LMW ethylene-based polymer comprise greater than 95 weight percent of the total weight of the composition.

10. The process of claim 1, wherein the composition has an I2 from 0.3 to 0.7 g/10 min.

11. A composition comprising a blend, wherein the blend comprises at least one high molecular weight (HMW) ethylene-based polymer, and at least one low molecular weight (LMW) ethylene-based polymer, and wherein the blend has an unsaturation level, as determined by IR, and expressed as vinyls per 1000 carbon atoms, less than, or equal to, 0.5 vinyls per 1000 carbon atoms, and wherein the blend has a high flow melt index ($I_{21}$) from 22 to 32 g/10 min, wherein the high molecular weight (HMW) ethylene-based polymer has a density greater than, or equal to, 0.935 g/cc, and wherein the weight ratio of the high molecular weight component to the low molecular weight component is from 40/60 to 70/30; and wherein the LMW ethylene-based polymer has a melt index, $I_2$, greater than or equal to 300 g/10 min, and wherein the HMW ethylene-based polymer and the LMW ethylene-based polymer comprise greater than 95 weight percent of the total weight of the composition; and wherein both the high molecular weight (HMW) ethylene-based polymer, and the low molecular weight (LMW) ethylene-based polymer are prepared using a Ziegler/Natta catalyst.

12. The composition of claim 11, wherein the blend has a high density fraction, as determined by ATREF, greater than, or equal to, 70 percent.

13. The composition of claim 11, wherein the blend has a purge fraction, as determined by ATREF, less than, or equal to, 20 percent.

14. An article comprising at least one component formed from the composition of claim 11.

15. The composition of claim 11, wherein the composition has an I21/I2 ratio from 70 to 100.

16. The composition of claim 15, wherein the composition has a high flow melt index ($I_{21}$) less than, or equal to, 30.

17. The composition of claim 16, wherein the composition has a I21/I2 from 75 to 95.

18. An injection blow molded article comprising at least one component formed from the composition of claim 17, and wherein the article has an ESCR (100% IGEPAL), F50 value greater than 1000 hours, and a water vapor transmission rate less than 0.7 g-mil/100 $in^2 \times day$.

19. The injection blow molded article of claim 18, wherein the article is a small sized container of 16 oz. or less.

20. The composition of claim 11, wherein the composition has an I2 from 0.3 to 0.7 g/10 min.

* * * * *